United States Patent [19]

Ho et al.

[11] Patent Number: 4,880,897

[45] Date of Patent: Nov. 14, 1989

[54] PROCESS FOR PREPARING AROMATIC POLYCARBONATES

[75] Inventors: Thoi Ho; Che-l Kao, both of Lake Jackson, Tex.

[73] Assignee: The Dow Chemical Company, Midland, Mich.

[21] Appl. No.: 235,580

[22] Filed: Aug. 24, 1988

[51] Int. Cl.$^4$ ............................................. C08G 63/62
[52] U.S. Cl. ................................... 528/199; 528/196; 528/202; 528/371; 528/372
[58] Field of Search ............... 528/199, 202, 196, 371, 528/372

[56] References Cited

U.S. PATENT DOCUMENTS

| | | | |
|---|---|---|---|
| 3,255,230 | 6/1966 | Kurkjy et al. | 260/463 |
| 3,271,364 | 9/1965 | Coaix et al. | 260/47 |
| 3,312,661 | 4/1967 | Kurkjy et al. | 260/47 |
| 3,428,600 | 2/1969 | Sullivan et al. | 260/47 |
| 3,530,094 | 9/1970 | Schnell et al. | 260/47 |
| 3,912,687 | 10/1975 | Haupt et al. | 260/463 X |
| 4,286,085 | 8/1981 | Jaquiss et al. | 528/199 |
| 4,316,980 | 2/1982 | Idel et al. | 528/199 |
| 4,413,103 | 11/1983 | Katsuhisa et al. | 525/469 |
| 4,737,573 | 4/1988 | Silva et al. | 528/371 |

*Primary Examiner*—Theodore E. Pertilla

[57] ABSTRACT

High molecular weight polycarbonates are prepared by reacting a sterically hindered, substituted aromatic bis-chloroformate with an alkali metal hydroxide in the presence of a substituted pyridine.

5 Claims, No Drawings

PROCESS FOR PREPARING AROMATIC POLYCARBONATES

BACKGROUND OF THE INVENTION

This invention relates generally to polycarbonate plastics, and more particularly to the preparation of high molecular weight substituted aromatic polycarbonates from sterically hindered monomers.

The preparation of substituted aromatic polycarbonates by interfacially polycondensing substituted aromatic dihydroxy compounds and phosgene is known. In this reactin, phosgene is passed into a well-stirred two-phase mixture of an aqueous alkaline solution containing the substituted aromatic dihydroxy compound and a polycarbonate solvent such as, for example, methylene choloride. It would be desirable to prepare high molecular weight substituted aromatic polycarbonates using solid or liquid raw materials, thereby eliminating the use of phosgene which is an extremely poisonous gas.

While interfacial polymerization processes, utilizing phosgene and dihydroxy compounds, are generally effective in producing substituted aromatic polycarbonates, they do suffer from a general difficulty in producing high molecular weight, i.e., having a relative viscosity ($n_{rel}$) greater than about 1.2, substituted aromatic polycarbonates, because of the steric hinderance caused by the substituent groups. It is, therefore, economically advantageous to promote such reactions to produce high molecular weight substituted aromatic polycarbonates, without having to employ more severe reaction conditions, by the use of a catalyst in the interfacial polymerization process.

The prior art discloses in U.S. Pat. No. 3,271,364, that certain quaternary ammonium compounds, such as, for example, triethylbenzylammonium chloride, catalyze the polycondensation of bischloroformates. Triethylbenzylammonium chloride will not, however, polymerize sterically hindered, substituted aromatic bischloroformates to give high molecular weight polycarbonates.

U.S. Pat. No. 3,912,687 teaches the preparation of substituted aromatic polycarbonates, utilizing phosgene and o,o,o',o'-tetro-substituted bisphenols, by an interfacial process using triethylamine as a catalyst. However, the process results in relatively low molecular weight products. Additionally, this process requires a long reaction time and large amounts of the catalyst.

The use of a substituted pyridine is taught in U.S. Pat. Nos. 4,286,085; 3,428,600 and 3,530,094, as a catalyst in the reaction of a dihydroxy phenol with a carbonate precursor such as phosgene or a bischloroformate. However, that reference does not suggest that a substituted pyridine would be an effective catalyst for the self condensation of a bischloroformate of a sterically hindered, substituted diphenol.

Accordingly, advantages of the present invention are that it provides an industrially advantageous process for the production of high molecular weight polycarbonates, using easily handleable raw materials, and avoiding highly toxic precursors such as, for example, phosgene.

Other advantages of the present invention will become apparent from the detailed description to follow.

SUMMARY OF THE INVENTION

There is now provided a new process for the production of high molecular weight polycarbonates comprising contacting, under interfacial polycarbonateproducing conditions, a substituted aromatic bischloroformate corresponding to the general formula:

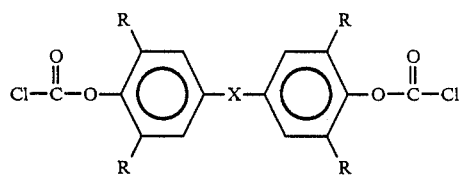

wherein X is a divalent $C_1$-$C_{15}$ hydrocarbon radical, a single bond, —O—, —S—, —S—S—, —SO—, —SO$_2$— or —CO—, and each R is independently a halogen or $C_1$-$C_4$ alkyl radical, with an alkali metal hydroxide, in the presence of an activated pyridine selected from the group including 4-aminopyridines of the general formula:

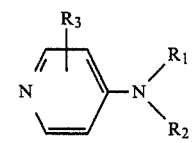

wherein $R_1$ and $R_2$ are each independently monovalent alkyl radicals, alkyl radical bridges to form cycloalkylene groups, or polymer chains, and $R_3$ is independently hydrogen or a monovalent alkyl radical, or 2-substituted pyridines of the general formula:

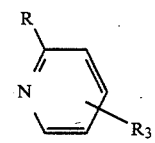

wherein R is a monovalent alkyl radical, a cycloalkyl radical, or a polymer chain, and $R_3$ is as previously defined, in an amount effective to catalyze the formation of a polycarbonate.

High molecular weight polycarbonates prepared by the present invention are exceptionally suitable for the manufacture of films, moldings and fibers.

DETAILED DESCRIPTION OF THE INVENTION

Suitable bischloroformates for carrying out the process according to the present invention can be prepared from sterically hindered, substituted aromatic diphenols, for example, by reacting with phosgene, and other methods previously known in the art. See U.S. Pat. Nos. 3,255,230 and 4,413,103, the teachings of which are incorporated herein by reference thereto. Suitable diphenol precursors include 2,2-bis(4-hydroxy-3,5-dibromophenyl)-propane, 2,2-bis(4-hydroxy-3,5-dichlorophenyl)-propane, bis(4-hydroxy-3,5-dibromophenyl)-methane, bis(4-hydroxy-3,5-dibromophenyl)-sulphone, bis(4-hydroxy-3,5-dibromophenyl)-sulphide, bis(4-hydroxy-3,5-dichlorophenyl)-methane, 1,1-bis(4-hydroxy-3,5-dichlorophenyl)-cyclohexane 2,2-bis(4--hydroxy-3,5-dimethylphenyl)-propane, bis(4-hydroxy-3,5-dimethylphenyl)-methane, bis(4-hydroxy-3,5-dimethylphenyl)-sulfone, bis(4-hydroxy-3,5-dimethylphenyl)-sulphide, 1,1-bis(4-hydroxy-3,5-dimethylphenyl)-cyclohexane, and the like. A preferred bischloroformate is the bischloroformate of 2,2-bis(4-hydroxy-3,5-dibromophenyl)propane.

Alkali metal hydroxides for use according to the present invention include sodium hydroxide, lithium hydroxide, potassium hydroxide, and the like. A preferred alkali metal hydroxide is sodium hydroxide.

Activated pyridines, which function as a catalyst in the bischloroformate polycondensation process of the present invention, are compounds whose chemistry and preparation are well-known in the art. Suitable 4-aminopyridines for use according to the present invention are 4-dimethylaminopyridine, 4-pyrrolidinopyridine and poly(N,N-dialkylaminopyridine). Examples of suitable 2-substituted pyridines are methylpyridine, ethylpyridine, isopropylpyridine and polyvinyl pyridine. The aforementioned activated pyridines having additional alkyl groups, such as those represented by the formulae:

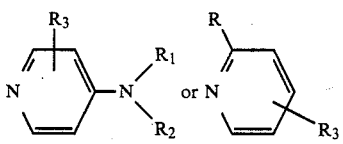

wherein R is a monovalent alkyl radical, a cycloalkyl radical, or a polymer chain, $R_1$ and $R_2$ are each independently monovalent alkyl radicals, alkyl radical bridges to form cycloalkylene groups, or polymer chains, and $R_3$ is independently hydrogen or a monovalent alkyl radical, may also be used. A preferred substituted pyridine is 4-methylaminopyridine. The amount of catalyst used varies according to the specific bischloroformate used and the reaction temperature, and in general is that amount effective to catalyze the formation of a polycarbonate.

The polycondensation reaction of the present invention is carried out by subjecting a bischloroformate and alkali metal hydroxide, in the presence of a catalytic amount of a substituted pyridine, to interfacial polycarbonate-forming conditions, employing a solution of water and an organic solvent, and using conventional techniques. Any suitable organic solvent, such as water-immiscible aliphatic and aromatic chlorinated hydrocarbons which are customarily used in making polycarbonates, may be used in practicing the present invention, such as for example methylene chloride, chloroform, 1,2-dichloroethane and chlorobenzene, and mixtures of these solvents. A preferred organic solvent is methylene chloride.

The reaction temperature can be selected freely within wide limits, preferably from 0° C. to 50° C., and more preferably from about 15° C. to about 30° C.

The pH of the reaction mixture is desirably maintained at from about 9 to about 13.0, and preferably from about 10 to about 11 for tetrahalogenated Bisphenol A reactants and from about 12 to about 12.5 for alkyl substituted reactants, by additional quantities of aqueous alkali metal hydroxide.

High molecular weight polycarbonates, i.e. having a relative viscosity greater than $n_{rel} = 1.17$, are advantageously prepared by the present invention. Such polycarbonates are particularly suitable for applications such as solvent cast films and solution spun fibers.

EXAMPLE 1

A five-neck round-bottom flask, fitted with a pH electrode, gas inlet tube, thermometer, caustic alkali inlet port, and electric paddle stirrer, is set in an ice water bath and purged with nitrogen. The flask is charged with 5 g (0.00725 mole) of the bischloroformate of 2,2-bis(4-hydroxy-3,5-dibromophenyl)-propane, followed by 50 g of methylene chloride, 20 g of water, 0.5 g of 50% sodium hydroxide aqueous solution, and 0.02 g (0.00016 mole) of dimethylaminopyridine. The mixture is stirred for about 40 minutes and the temperature of the mixture is maintained at about 22° C. A 50% sodium hydroxide aqueous solution is intermittently added to maintain a pH of 10.5. The mixture is then diluted with methylene chloride and stirred until no chloroformate remains. The organic phase is washed with dilute HCl and water, then dried. A film is produced from the dried polycarbonate. A portion of the film is dissolved in methylene chloride, and the resultant solution has a relative viscosity of 1.30 measured in methylene chloride at 25° C. at a concentration of 5 g/l.

EXAMPLE 2

The procedure of Example 1 is repeated, excepting that 0.00725 mole of the bischloroformate of 2,2-bis(4-hydroxy-3,5-dichlorophenyl)-propane is used. The resultant polymer has a relative viscosity of 1.35 measured in methylene chloride at 25° C. at a concentration of 5 g/l.

EXAMPLE 3

A five-neck round-bottom flask, fitted with a pH electrode, gas inlet tube, thermometer, caustic alkali inlet port, and electric paddle stirrer, is set in an ice water bath and purged with nitrogen. The flask is charged with 31.1 g (0.088 mole) of the bischloroformate of 2,2-bis(4-hydroxy-3,5-dimethylphenyl)-propane, followed by 230 g of methylene chloride, 150 g of water, 7.5 g of 50% sodium hydroxide aqueous solution, and 0.54 g (0.0044 mole) of dimethylaminopyridine. The mixture is stirred for about 20 minutes and the temperature of the mixture is maintained at about 22° C. A 50% sodium hydroxide aqueous solution is intermittently added to maintain a pH of 12.0 to 12.5. The mixture is then diluted with methylene chloride and stirred until no chloroformate remains. The organic phase is washed with dilute HCl and water, then dried. A film is produced from the dried polycarbonate. A portion of the film is dissolved in methylene chloride, and the resultant solution has a relative viscosity of 1.40 measured in methylene chloride at 25° C. at a concentration of 5 g/l.

What is claimed is:

1. A process for the preparation of high molecular weight polycarbonates, comprising contacting under interfacial polycarbonate-forming conditions, a substituted aromatic bischloroformate corresponding to the general formula:

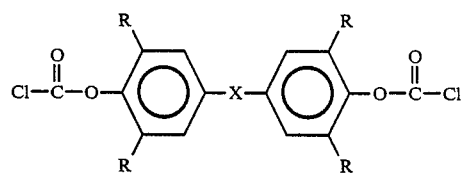

wherein X is a divalent $C_1$-$C_{15}$ hydrocarbon radical, a single bond, —O—, —S—, —S—S—, —SO—, —SO$_2$— or 13 CO—, and each R is independently a halogen or $C_1$-$C_4$ alkyl radical, with an alkali metal hydroxide, in the presence of an activated pyridine selected from the group including 4-aminopyridines of the general formula:

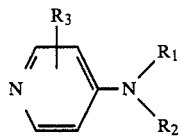

wherein $R_1$ and $R_2$ are each independently monovalent alkyl radicals, alkyl radical bridges to form cycloalkylene groups, or polymer chains, and $R_3$ is independently hydrogen or a monovalent alkyl radical, or 2-substituted pyridines of the general formula:

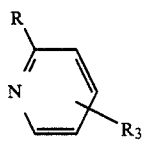

wherein R is a monovalent alkyl radical, a cycloalkyl radical, or a polymer chain, and $R_3$ is as previously defined, in an amount effective to catalyze the formation of a polycarbonate.

2. The process recited in claim 1, wherein the interfacial polycarbonate-forming conditions further comprise reacting the bischloroformate with the alkali metal hydroxide in a mixture of water and methylene chloride, said mixture maintained at a pH of about 9 to about 13, and at a temperature of about 22° C.

3. The process recited in claim 2, wherein said bischloroformate is the bischloroformate of 2,2-bis(4-hydroxy-3,5-dibromophenyl)-propane, and the alkali metal hydroxide is sodium hydroxide.

4. The process recited in claim 2, wherein said bischloroformate is the bischloroformate of 2,2-bis(4-hydroxy-3,5-dichlorophenyl)-propane, and the alkali metal hydroxide is sodium hydroxide.

5. The process recited in claim 2, wherein said bischloroformate is the bischloroformate of 2,2-bis(4-hydroxyl-3,5-dimethylphenyl)-propane and the alkali metal hydroxide is sodium hydroxide.

* * * * *